US007320002B2

(12) United States Patent
Chickering (10) Patent No.: US 7,320,002 B2
(45) Date of Patent: Jan. 15, 2008

(54) USING TABLES TO LEARN TREES

(75) Inventor: David M. Chickering, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 10/809,054

(22) Filed: Mar. 25, 2004

(65) Prior Publication Data

US 2005/0216496 A1 Sep. 29, 2005

(51) Int. Cl.
*G06F 17/00* (2006.01)

(52) U.S. Cl. .......................................... 707/100; 707/3

(58) Field of Classification Search .................... 707/1, 707/2, 3, 5, 100, 104.1, 6, 102; 706/45, 52, 706/46, 12, 15, 47
See application file for complete search history.

(56) References Cited

U.S. PATENT DOCUMENTS

| | | | |
|---|---|---|---|
| 6,336,108 B1 | 1/2002 | Thiesson et al. | |
| 6,408,290 B1* | 6/2002 | Thiesson et al. | 706/52 |
| 6,496,816 B1 | 12/2002 | Thiesson et al. | |
| 6,499,025 B1 | 12/2002 | Horvitz et al. | |
| 6,502,082 B1 | 12/2002 | Toyama et al. | |
| 6,895,398 B2* | 5/2005 | Evans-Beauchamp et al. | 706/50 |
| 7,047,169 B2* | 5/2006 | Pelikan et al. | 703/2 |
| 2002/0019870 A1 | 2/2002 | Chirashnya et al. | |
| 2003/0126104 A1* | 7/2003 | Evans-Beauchamp et al. | 707/1 |
| 2004/0199484 A1* | 10/2004 | Smith et al. | 706/52 |
| 2004/0243548 A1* | 12/2004 | Hulten et al. | 707/3 |

OTHER PUBLICATIONS

Zhang et al., Learning Bayesian Network Classifiers from Data with Missing Values, TENCON '02 Proceedings 2002 IEEE Region 10 Conference on Computers, Communications Engineering, vol. 1, Oct. 28-31, 2002, pp. 35-38.*
Geoff Hulten, et al., Learning Bayesian Networks From Dependency Networks: A Preliminary Study, 9th International Workshop on Artificial Intelligence and Statistics, 2003, 8 pages, Key West, Florida, USA.
David Maxwell Chickering, Learning Equivalence Classes of Bayesian-Network Structures, Journal of Machine Learning Research, Feb. 2002, pp. 445-498, vol. 2.
Margaret Mitchell, Use of Directed Acyclic Graph Analysis in Generating Instructions for Multiple Users, Australian Symposium on Information Visualization, Dec. 2001, pp. 57-62, Sydney, Australia.
David Heckerman, et al., Dependency Networks for Inference, Collaborative Filtering, and Data Visualization, Journal of Machine Learning Research, 2000, 32 pages.
Andrew Moore, et al., Cached Sufficient Statistics for Efficient Machine Learning with Large Datasets, Journal of Artificial Intelligence Research, Mar. 1998, pp. 67-91, vol. 8.
David Heckerman, A Tutorial on Learning With Bayesian Networks, Microsoft Research, Nov. 1996, 57 pages.

* cited by examiner

*Primary Examiner*—Greta Robinson
(74) *Attorney, Agent, or Firm*—Amin, Turocy & Calvin, LLP (57) ABSTRACT

Systems and methods are described that facilitate learning a Bayesian network with decision trees via employing a learning algorithm to learn a Bayesian network with complete tables. The learning algorithm can comprise a search algorithm that can reverse edges in the Bayesian network with complete tables in order to refine a directed acyclic graph (DAG) associated therewith. The refined complete-table DAG can then be employed to derive a set of constraints for a learning algorithm employed to grow decision trees within the decision-tree Bayesian network.

23 Claims, 9 Drawing Sheets

USING TABLES TO LEARN TREES

TECHNICAL FIELD

The present invention relates generally to data modeling and analysis, and more particularly to utilizing a complete data table to create a model (or pattern).

BACKGROUND OF THE INVENTION

With the advent of the Internet, and especially electronic commerce ("e-commerce") over the Internet, the use of data analysis tools, has increased dramatically. In e-commerce and other Internet and non-Internet applications, databases are generated and maintained that have astronomically large amounts of information. Such information is typically analyzed, or "mined," to learn additional information regarding customers, users, products, etc. This information allows businesses and other users to better implement their products and/or ideas.

Data mining (also known as Knowledge Discovery in Databases—KDD) has been defined as "The nontrivial extraction of implicit, previously unknown, and potentially useful information from data." Data mining can employ machine learning, statistical and/or visualization techniques to discover and present knowledge in a form that is easily comprehensible to humans. Generally speaking, humans recognize or translate graphical items more easily than textual ones. Thus, larger amounts of information can be relayed utilizing this means than by other methods. As such, graphical statistical models have proven invaluable in data mining.

The advent of artificial intelligence within computer science has brought an abundance of decision-support systems. Decision-support systems are computer systems in which decisions, typically rendered by humans, are recommended and sometimes made. In creating decision-support systems, computer scientists seek to provide decisions with the greatest possible accuracy. Thus, computer scientists strive to create decision-support systems that are equivalent to or more accurate than a human expert. Applications of decision-support systems include medical diagnosis, troubleshooting computer networks, or other systems wherein a decision is based upon identifiable criteria.

One of the most promising new areas for research in decision-support systems is Bayesian networks. A Bayesian network is a representation of the probabilistic relationships among distinctions about the world. Each distinction, sometimes called a variable, can take on one of a mutually exclusive and exhaustive set of possible states. A Bayesian network is expressed as an acyclic-directed graph where the variables correspond to nodes and the relationships between the nodes correspond to arcs.

A Bayesian network is a graphical statistical model that encodes probabilistic relationships among variables of interest. Over the last decade, the Bayesian network has become a popular representation for encoding uncertain expert knowledge in expert systems. More recently, researchers have developed methods for learning Bayesian networks from data. When used in conjunction with statistical techniques, the graphical model has several advantages for data analysis. First, because the model encodes dependencies among all variables, it readily handles situations where some data entries are missing. Second, a Bayesian network can be used to learn causal relationships, and hence can be used to gain understanding about a problem domain and to predict the consequences of intervention. Third, because the model has both a causal and probabilistic semantics, it is an ideal representation for combining prior knowledge (which often comes in causal form) and data. And fourth, Bayesian statistical methods in conjunction with Bayesian networks offer an efficient and principled approach for avoiding the over fitting of data.

There are two traditional approaches for constructing statistical models, such as decision trees or decision graphs, namely, a knowledge-based approach and a data-based approach. Using the knowledge-based approach, a person (known as a knowledge engineer) interviews an expert in a given field to obtain the knowledge of the expert about the field of expertise of the expert. The knowledge engineer and expert first determine the distinctions of the world that are important for decision making in the field of the expert. These distinctions correspond to the variables in the domain of interest. For example, if a decision graph is to be used to predict the age of a customer based on the products that customer bought in a store, there would be a variable for "age" and a variable for all relevant products. The knowledge engineer and the expert next determine the structure of the decision graph and the corresponding parameter values that quantify the conditional probability distribution.

In the data-based approach, the knowledge engineer and the expert first determine the variables of the domain. Next, data is accumulated for those variables, and an algorithm is applied that creates one or more decision graphs from this data. The accumulated data comes from real world instances of the domain. That is, real world instances of decision making in a given field.

Typically, the data-based approach is more commonly utilized from a general stand point. Over the last few years, however, the sizes of these databases have been exponentially increasing as the ability to gather data more efficiently increases. This has produced enormous databases that take immense amounts of time to analyze, despite the ever-increasing speeds gained in computer processing technology and storage access techniques.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to data modeling and analysis, and more particularly to utilizing a Bayesian network comprising complete tables, to create a Bayesian-network model (or pattern) containing decision trees. According to an aspect of the invention, edges in a Bayesian network with complete tables can be reversed to facilitate correction of edges added to that network. For example, a Bayesian network can be learned with complete tables as distributions, where the learning algorithm utilizes a search algorithm that can reverse edges. A resulting directed acyclic graph (DAG) can be employed to restrict a Bayes' net learning algorithm that uses decision trees as the local distribution. According to this aspect, the partial order of the complete-table DAG is respected in the DAG that results from the decision tree and/or complete table search. In this manner, if a direct path exists from X to Y in the complete-table DAG, then splits on Y in X's tree can be prohibited.

According to another aspect of the invention, edges in a Bayes' net with complete tables can be evaluated to assess a score associate therewith. Such score can be indicative of the degree of dependence between nodes connected by the edge. Alternate node/edge arrangements can be considered, and a determination can be made regarding whether the existing edge has the best possible score. If edge score can be improved, then the existing edge can be manipulated (e.g., reversed, removed and replaced with a new edge, etc.) to achieve the increased score. In this manner, the invention can ensure that the Bayes' net has a good ordering.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention can become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It can be evident, however, that the present invention can be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component can be, but is not limited to being, a process running on a processor, a processor, an object, an executable, a thread of execution, a program, and/or a computer. By way of illustration, both an application running on a server and the server can be a computer component. One or more computer components can reside within a process and/or thread of execution and a component can be localized on one computer and/or distributed between two or more computers. It is to be appreciated that a model, network, query engine, user interface, comparator, model (or pattern) as described herein can be computer components.

The present invention facilitates learning Bayesian networks from data, which involves searching for a structure of a model (e.g. the DAG) that best represents the independencies in the data. A Bayesian network comprises a DAG and a corresponding set of local distributions, the set of local distributions collectively define a joint distribution in which independence constraints implied by the DAG are all respected. For example, when each local distribution p(X|parents) is a complete table (e.g. we have a separate distribution p(X|parents=parent_values) for all possible values of parent_values) typical search procedures can consider adding, deleting, and reversing edges.

When local distributions are decision trees, the search problem can be more difficult. Whenever a decision tree for some target T contains a split on a variable R, R will be a parent of T in the DAG. In such a scenario, and in contrast to complete-table distributions, the set of parents of a node do not uniquely identify the local distribution for that node. Thus, the search algorithm can also search for the "substructure" of the distribution (e.g, the structure of the tree, etc.).

In many cases, the quality of a learned model is dependent on deriving a correct partial order in the DAG. For example, if the structure $X \rightarrow Y \leftarrow Z$ is learned, such model structure can be superior to $X \rightarrow Y \rightarrow Z$, $X \rightarrow Z$ because it encodes the marginal independence of X and Z. When local distributions are complete tables, a search operator can reverse the direction of an edge. In this manner, if an algorithm initially incorrectly applies the direction of an edge, it can correct for this mistake later. In the example above, if a greedy algorithm starts with an empty network, the score of adding $X \rightarrow Y$ will be the same as adding $Y \rightarrow X$ because the models $X \rightarrow Y$ Z and $X \leftarrow Y$ Z encode the same independence constraints. Assuming both of these operators are the best, a greedy algorithm will choose between them arbitrarily. If the optimal model is $X \rightarrow Y \leftarrow Z$, the algorithm can recover from adding $X \leftarrow Y$ by reversing it later. As mentioned above, if equivalent classes of DAGs are utilized in conjunction with appropriate operators, then the algorithm can recover from any such errors.

When the local distributions are trees, however, conventional systems and methods do not provide for a well-defined notion of edge-reversal. Reversing an edge $X \rightarrow Y$ comprises (1) deleting X as a parent of Y, and (2) adding Y as a parent of X. Deleting X as a parent of Y comprises eliminating any split on X in the decision tree for Y. If there are other splits subordinate to splits on X, then such elimination can eliminate other parents as well. Furthermore, "adding Y as a parent of X" is not well defined for a decision-tree distribution using convention systems and/or methods: rather a split on Y in the tree for X is necessary.

As a result of the above-mentioned shortcomings, traditional search operators for learning Bayes' nets with decision-tree distributions typically consider adding splits to trees; such an operator will either add an edge to the DAG if it is a new parent, or add no edge to the DAG if there already existed a split on that parent. Unfortunately, because traditional systems only add edges, recovery from adding an edge in a wrong direction is not possible using such conventional systems. Furthermore, as in the complete-table case, the choice between the direction of the edge (e.g. splitting on X in Y's tree or splitting on Y in X's tree, etc.) can be arbitrary in the early stages of greedy search.

The present invention facilitates learning Bayesian networks with decision trees while mitigating many of the difficulties mentioned above. For example, a Bayesian network can be learned with complete tables in the distributions, using a search algorithm that can reverse edges. A resulting DAG can be employed to restrict a decision-tree search algorithm. In particular, the systems and methods of the present invention can require that the partial order of the complete-table DAG be respected in the DAG that results from the decision-tree search. In other words, if there is a directed path from X to Y in the complete-table DAG, splits on Y in X's tree can be prohibited.

Figure 1:
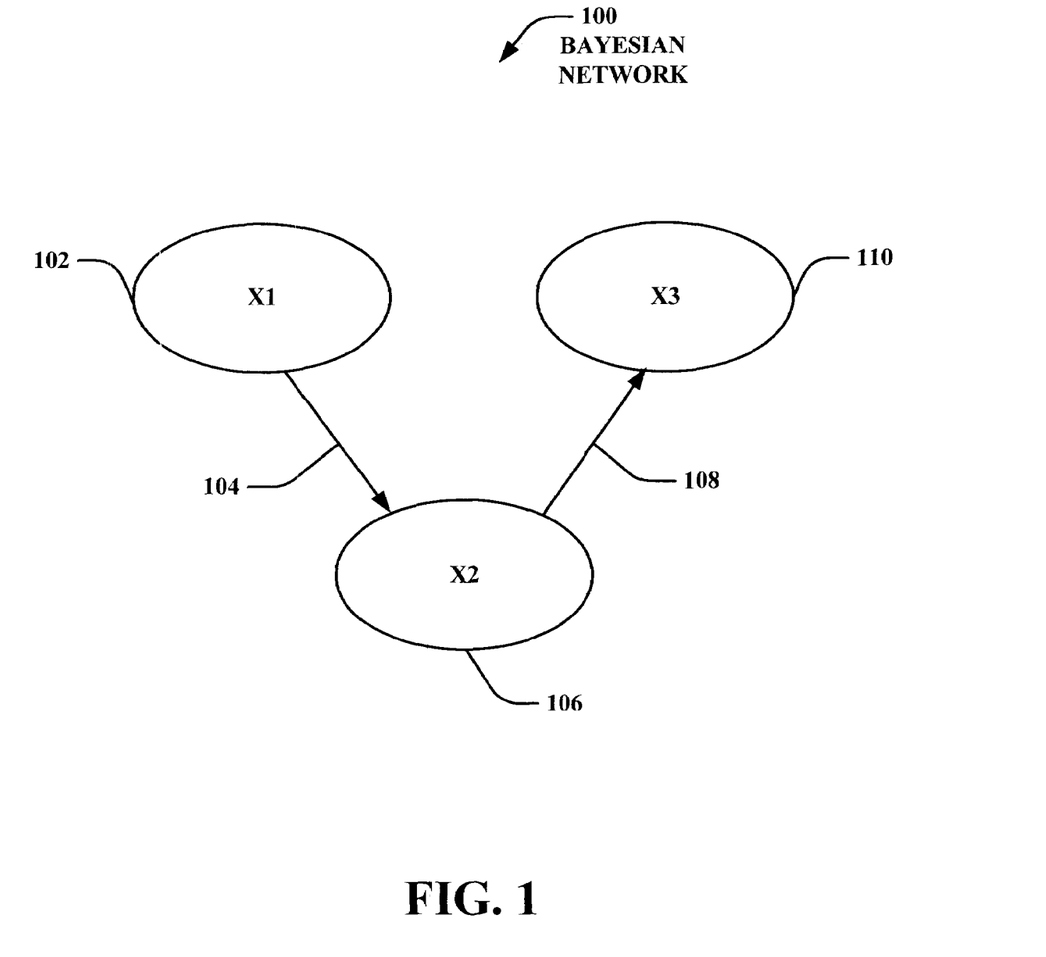
FIG. 1 is an illustration of an exemplary Bayesian network in accordance with an aspect of the present invention.

FIG. 1 depicts an example of a Bayesian network 100. In FIG. 1 there are three variables, $X_1$, $X_2$, and $X_3$, which are represented by nodes 102, 106 and 110, respectively. This Bayesian network comprises two arcs 104 and 108. Associated with each variable in a Bayesian network is a set of probability distributions. Using conditional probability notation, the set of probability distributions for a variable can be denoted by $p(x_i|\Pi_i, \xi)$, where "p" refers to the probability distribution, where "$\Pi_i$" denotes the parents of variable $X_i$, and where "$\xi$" denotes the knowledge of an expert. The Greek letter "$\xi$" indicates that the Bayesian network reflects the knowledge of an expert in a given field. Thus, this expression reads as follows: the probability distribution for variable $X_i$ given the parents of $X_i$ and the knowledge of the expert. For example, $X_1$ is the parent of $X_2$. The probability distributions specify the strength of the relationships between variables. For instance, if $X_1$ has two states (true and false), then associated with $X_1$ is a single probability distribution $p(x_1|\xi)$ and associated with $X_2$ are two probability distributions $p(x_2|x_1=t, \xi)$ and $p(x_2|x_1=f, \xi)$. In the remainder of this specification, $\xi$ is not specifically mentioned.

The arcs in a Bayesian network convey dependence between nodes. When there is an arc between two nodes, the probability distribution of the first node depends upon the value of the second node when the direction of the arc points from the second node to the first node. For example, node 106 depends upon node 102. Therefore, nodes 102 and 106 are said to be conditionally dependent. Missing arcs in a Bayesian network convey conditional independencies. For example, node 102 and node 110 are conditionally independent given node 106. However, two variables indirectly connected through intermediate variables are conditionally dependent given lack of knowledge of the values ("states") of the intermediate variables. Therefore, if the value for node 106 is known, node 102 and node 110 are conditionally dependent.

In other words, sets of variables X and Y are said to be conditionally independent, given a set of variables Z, if the probability distribution for X given Z does not depend on Y. If Z is empty, however, X and Y are said to be "independent" as opposed to "conditionally independent." If X and Y are not conditionally independent, given Z, then X and Y are said to be conditionally dependent given Z.

The variables used for each node can be of different types. Specifically, variables may be of two types: discrete or continuous. A discrete variable is a variable that has a finite or countable number of states, whereas a continuous variable is a variable that has an infinite number of states. An example of a discrete variable is a Boolean variable. Such a variable can assume only one of two states: "true" or "false." An example of a continuous variable is a variable that may assume any real value between −1 and 1. Discrete variables have an associated probability distribution. Continuous variables, however, have an associated probability density function ("density"). Where an event is a set of possible outcomes, the density p(x) for a variable "x" and events "a" and "b" is defined as:

$$p(x) = \lim_{a \to b}\left[\frac{p(a \leq x \leq b)}{|(a-b)|}\right]$$

where $p(a \leq x \leq b)$ is the probability that x lies between a and b.

Figure 2:
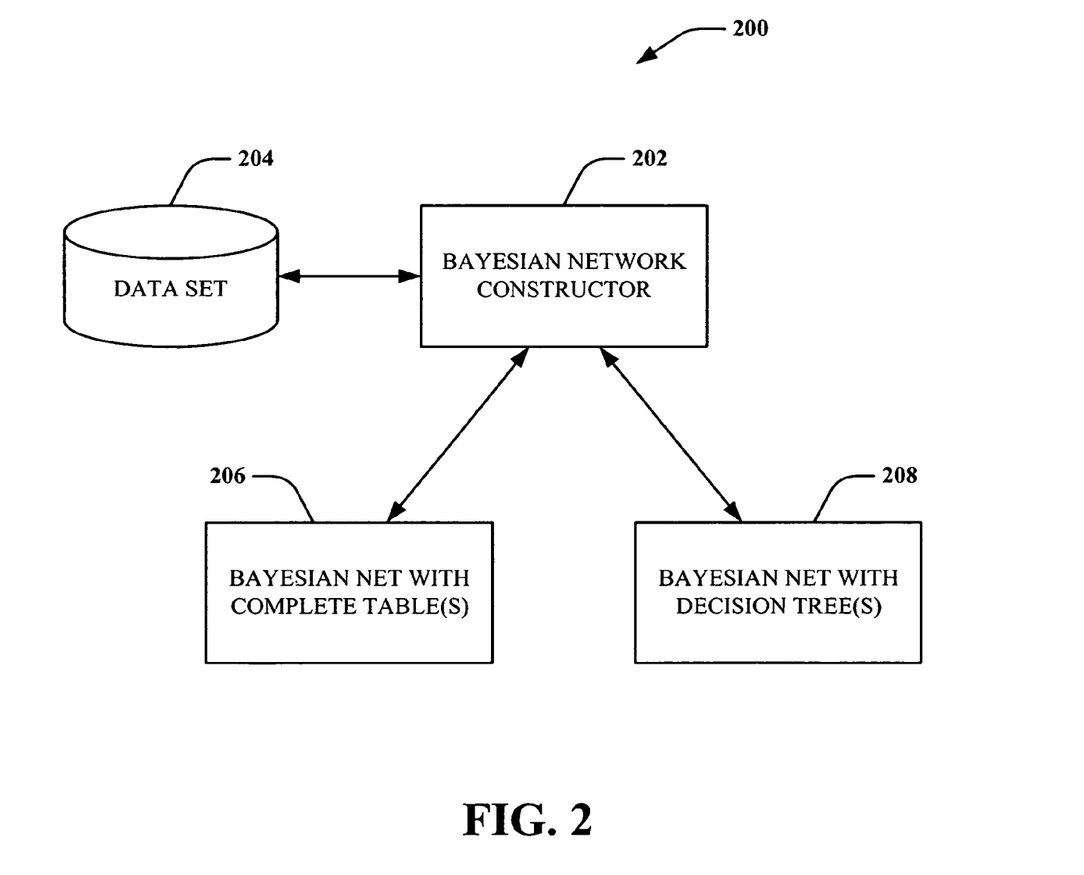
FIG. 2 is a block diagram of a Bayesian network learning system in accordance with an aspect of the present invention.

FIG. 2 illustrates a Bayes' net learning system 200 in accordance with an aspect of the present invention. FIG. 2 depicts a Bayesian network constructor 202 that analyses data comprised by a data set 204. The Bayesian network constructor 202 can develop a Bayesian network with complete tables 206 based on information gleaned from the data set 204 in order to determine a partial order for the data. The Bayesian network constructor 202 can then analyze the data set 204 and the Bayesian network with complete tables 206 using a search algorithm to identify other potential arrangements of edges within the Bayesian network, and can compare such other arrangements to the partial order defined by the Bayesian network with complete tables 206. If it is determined that a better ordering exists, then the Bayesian network constructor 202 can manipulate (e.g., reverse, remove and/or replace, etc.) edges in the Bayes' net in order to construct a new Bayesian network 208 with decision trees that form local distributions. The decision trees of the new Bayesian network 208 can be grown with edges arranged in accordance with the determined better ordering. A directed acyclic graph (DAG) derived from the complete table(s) can be employed to restrict a learning algorithm employed by the Bayesian network constructor 202, such that construction of the new Bayesian network with decision trees 208 can be implemented with an insistence that the partial order of the complete-table DAG be respected in a DAG that results from the decision tree and/or complete-table search. For example, if the DAG for a complete table comprises a direct path from X to Y, then the Bayesian network learning algorithm can prohibit splits on Y in X's tree in the Bayesian network with decision trees 208.

The constructor 202 can comprise a processor (not shown) that can facilitate analysis of data set(s), DAGs, Bayes' nets, etc. Furthermore, the processor can employ artificial intelligence techniques in order to facilitate inferring, for example, potential arrangements of edges in a Bayesian network. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, regression methods . . . ) can be employed in connection with performing automatic and/or inferred action in connection with the subject invention.

Although the present invention described herein emphasizes utilizing decision trees as the local distributions, it is to be appreciated that such emphasis is proffered to simplify explanation of the invention and that the present invention can be employed to facilitate construction and/or improvement of Bayesian networks comprising conditional distributions other than decision trees. For example, conditional distributions can be neural networks, logistic/linear regression models, support vector machines (SVMs), and the like. Furthermore, the type of conditional distribution employed at one node can differ from the type of conditional distribution employed at another node. As will be appreciated by one skilled in the art with regard to the aforementioned distribution types, learning algorithms require a feature-selection algorithm to identify relevant inputs to the distribution, which in turn define parents in a Bayesian network. Because splitting on a variable in a decision tree has the effect of selecting the variable from which the split originates as an input, traditional decision-tree learning algorithms perform feature selection automatically. The systems and methods disclosed herein facilitate an improved heuristic search algorithm for Bayesian networks that can overcome deficiencies of conventional methods. To this end, the present invention can enhance identification of a statistical model containing a set of SVM distributions that facilitates, for example, speech and/or handwriting recognition in a computer system, protein structure and/or sequence analysis, gene sequencing, etc. This list of potential applications is not exhaustive, but is exemplary in nature and is not intended to limit the scope of the present invention in any manner.

Figure 3:
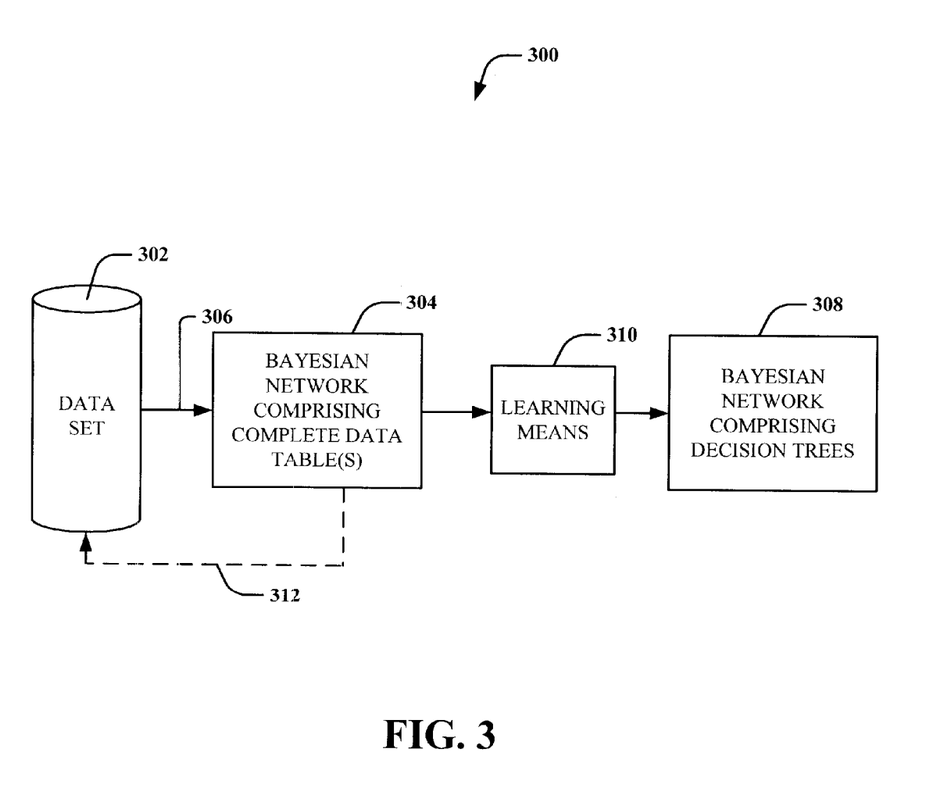
FIG. 3 is another block diagram of a Bayesian network learning system in accordance with an aspect of the present invention.

FIG. 3 is an illustration of a Bayesian network learning system 300 that depicts various stages of data manipulation that facilitate construction of a Bayes' net with decision trees from a data set, in accordance with an aspect of the present invention. The learning system 300 comprises a data set 302, a Bayesian network containing complete tables 304 with a means 306 to extract information from the data set, and a Bayesian network comprising decision trees 308 with a learning means 310 to learn the Bayesian network with decision trees 308 using the partial order defined by the Bayesian network with complete tables 304. According to one example, the learning system 300 can analyze information comprised by the data set 302 and construct the Bayesian network with complete tables 304 via a learning algorithm. The learning algorithm can comprise a search algorithm that that can reverse edges in the complete-table network 304. Based on such a Bayesian network 304, a partial order of a complete-table DAG can be determined and/or defined via analysis of edges in the Bayesian network with complete tables 304. Once the partial order has been evaluated, the data set 302 can be revisited and reassessed via means 312 to evaluate and/or compare the DAG defined by the Bayesian network with complete tables 304 to other potential arrangements of the data set 302 in order to facilitate analysis of whether the partial order can be improved. Determinations can be made regarding, for example, whether manipulation (e.g., reversal, deletion, addition, etc.) of a particular edge in the Bayesian network with complete tables 304 will facilitate achieving a more optimal ordering. If such determinations indicate that the ordering can be improved, then edges can be manipulated and the new Bayesian network 308 can be learned with decision trees in local distributions in order to facilitate achieving the better ordering. Such can be facilitated by employing a Bayes' net learning algorithm that respects the partial order of the complete-table DAG when constructing the decision-tree DAG.

Figure 4:
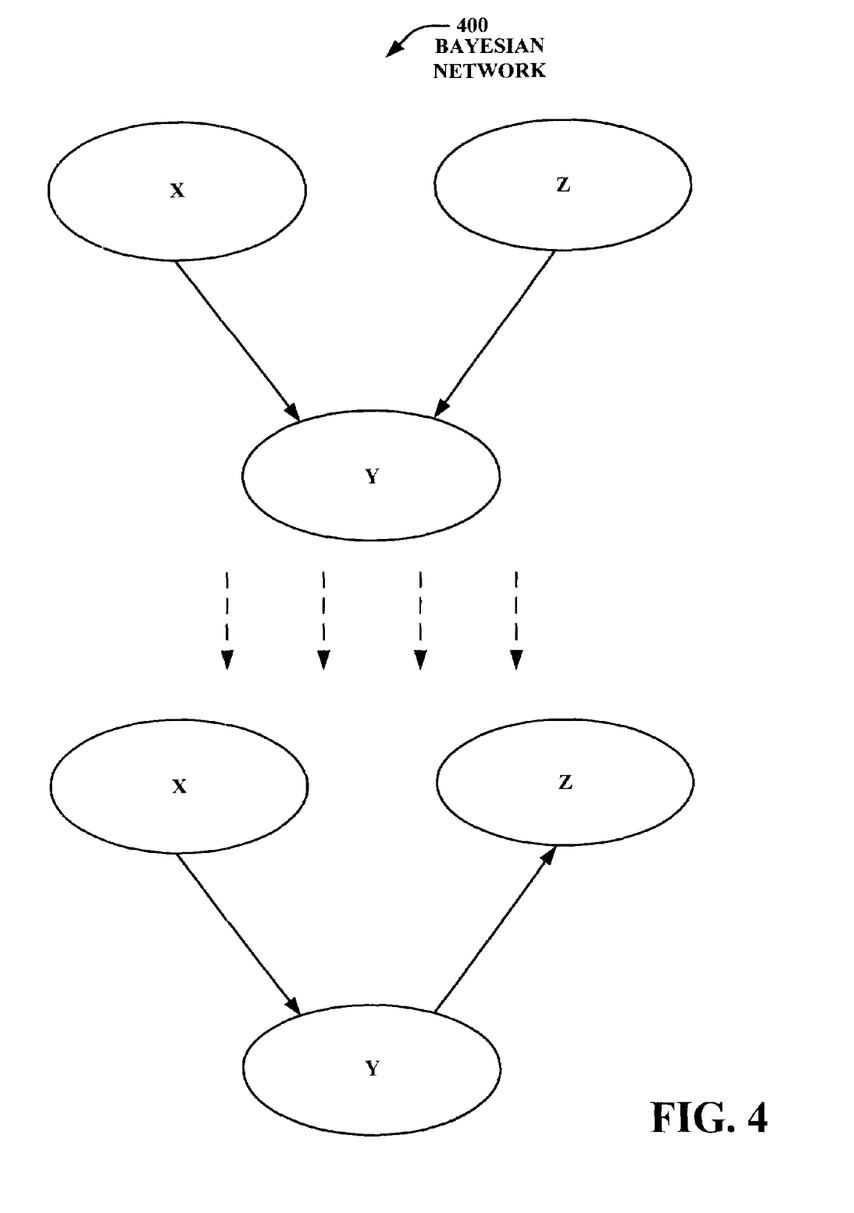
FIG. 4 is an illustration of exemplary node-edge configuration(s) in accordance with an aspect of the present invention.

FIG. 4 is an illustration of a simple exemplary Bayesian network 400 comprising complete tables. Complete tables are useful for learning edges in a Bayesian network because they can comprise information regarding the shape of the distribution. For example, a decision tree can comprise local distributions that are incomplete, which can result in a lack of shape information. By employing a complete table to learn a Bayesian network, a less greedy search can be performed than is required by conventional methods, which facilitates determining a good ordering of data dependency. The "V" structure illustrated in FIG. 4 is one such information-rich ordering structure. According to the figure, X and Z must precede Y. Once such ordering is learned, it can be applied as a constraint to, for example, a decision tree learning model. For instance such a constraint can insist that an edge cannot be added to a variable if that variable is a descendant in the original ordering. In this manner a high-quality approximation of the ordering can be provided and then fine-tuned in order to grow a decision tree, such as a Bayesian network.

According to this aspect of the invention, as illustrated in FIG. 4, initially X and Z are independent of each other (e.g, knowledge regarding X cannot be gained by knowing Z). For example, if X represents an occurrence of rain, Z represents a randomly-timed sprinkler system, and Y represents wet grass, then knowledge that it has rained (e.g., X is true) does not presume that the sprinkler system has not also been activated (e.g., that Z is also true). However, the second schematic illustrates that that X is statistically dependent on Z given Y, such that if it is known that the sprinkler system has been activated and that the grass is wet, then the probability of rain having occurred is reduced. In this manner, the invention can glean information regarding ordering of data during a complete table search, and then employ the ordering information to facilitate decision tree expansion.

FIG. 4 is illustrated with hashed arrows directed from the first schematic to the second schematic in order to illustrate that an action can occur whereby the direction of an edge between two variables can be actively reversed, in accordance with an aspect of the invention. Such edge reversal facilitates achieving a best score for a leaf node, tree, etc., when learning Bayesian networks.

Figure 5:
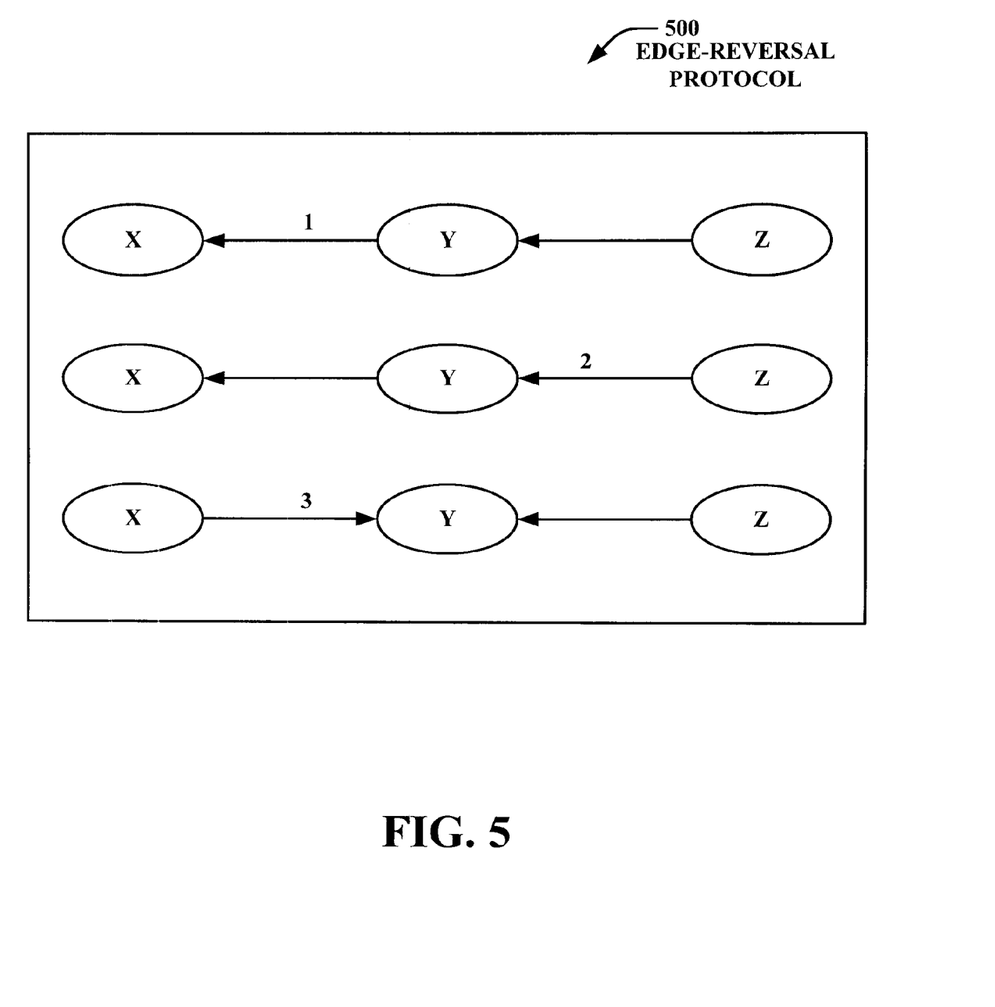
FIG. 5 is illustrates leaf-node connection(s) in accordance with an aspect of the present invention.

FIG. 5 illustrates an edge-reversal protocol 500 in accordance with an aspect of the invention. Initially, an edge is inserted between X and Y, indicating that X depends on Y. A second edge is inserted between Y and Z illustrating that Y is dependent on Z, and that X is now dependent on Z given Y. A score can be assigned to the X-Y-Z leaf node in order to facilitate learning, for example, a Bayesian network, as described herein supra. At this point, it can be determined that the initially added edge was inserted in an incorrect direction (e.g., X should not be dependent on Y, etc.) Such a determination can be made via, for example, determining score(s) for the leaf node with respect to other possible dependency relationships between variables in the leaf node. If an alternate combination produces a higher score (e.g., a greater likelihood of correctness), then such a combination can be implemented by reversal of the direction of the edge. In this manner, the invention can overcome problems associated with employing conventional decision trees, which previously could not be corrected because of a lack of consideration for edge direction.

According to this example, if the structure Z→Y←X is learned, such model structure can be superior to, for example Z→Y→X, Z→X because it encodes the marginal independence of X and Z. When local distributions are complete tables, a search operator can reverse the direction of an edge to facilitate such a superior ordering or structure. In this manner, if an algorithm initially incorrectly applies the direction of an edge, it can correct for this mistake later. In the example above, if a greedy algorithm starts with an empty network, the score of adding X→Y will be the same as adding Y→X because the models X→Y Z and X←Y Z encode the same independence constraints. Assuming both of these operators are the best, a greedy algorithm will choose between them arbitrarily. If the optimal model is X→Y←Z, the algorithm can recover from adding X←Y by reversing it later. As mentioned above, if equivalent classes of DAGs are utilized in conjunction with appropriate operators, then the algorithm can recover from any such errors.

Figure 6:
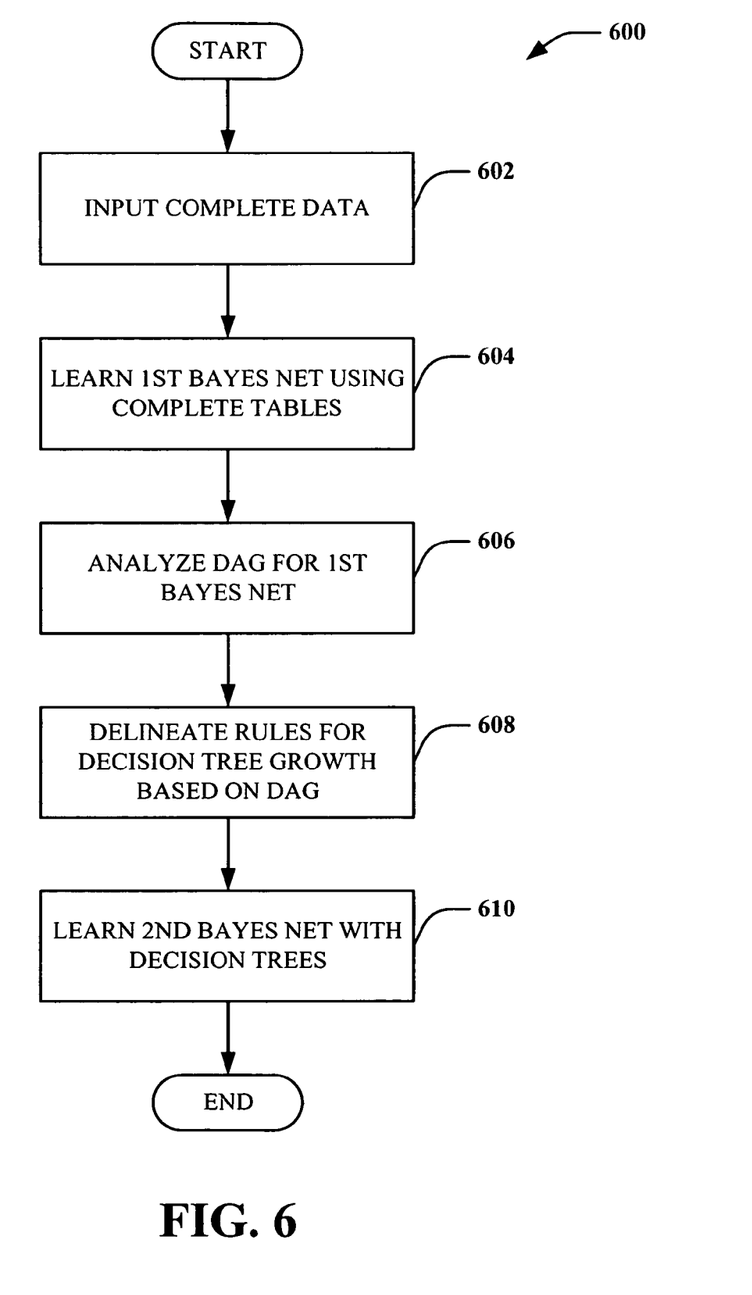
FIG. 6 is a flow diagram illustrating a methodology for learning a Bayesian network with decision trees in accordance with an aspect of the present invention.
Figure 7:
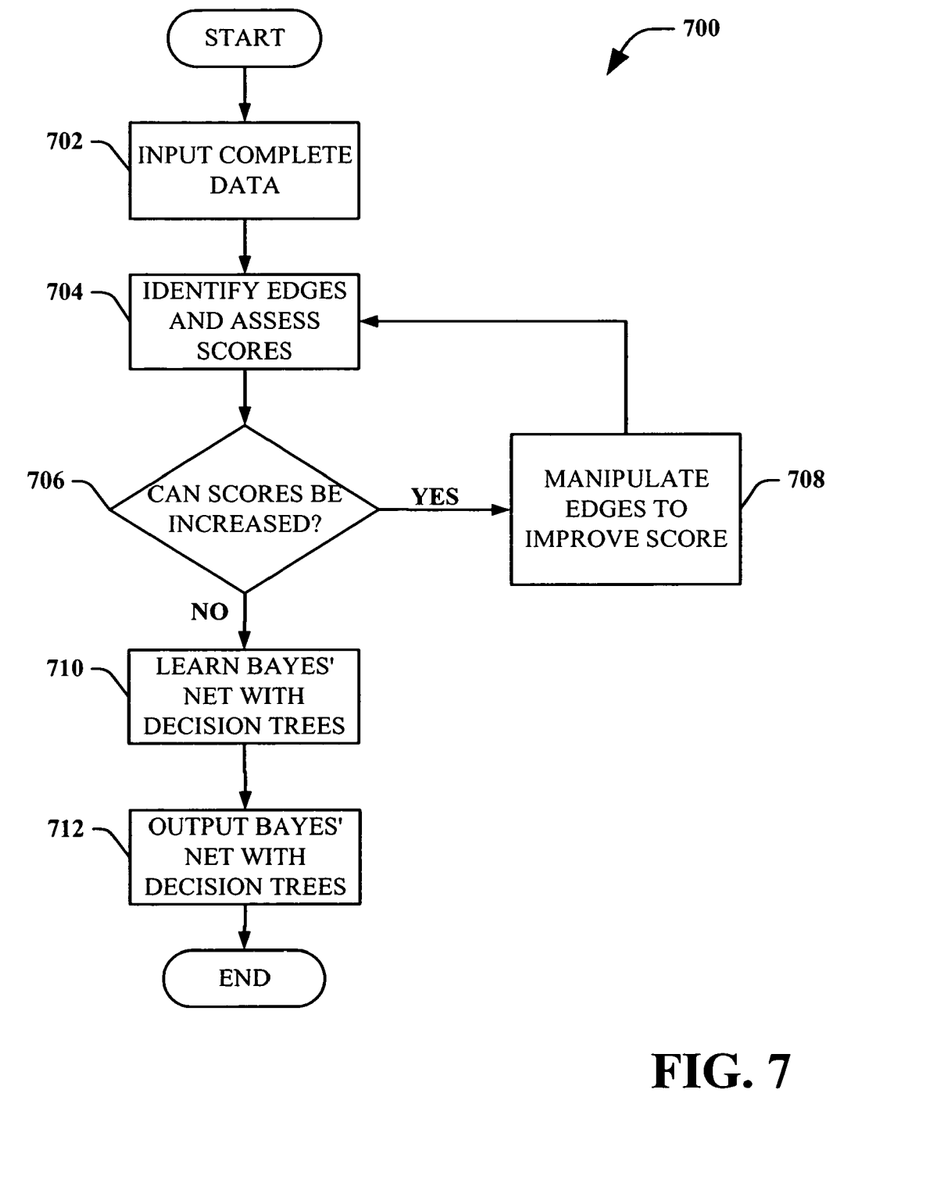
FIG. 7 is another flow diagram illustrating a methodology of learning a Bayesian network with decision trees in accordance with an aspect of the present invention.

In view of the exemplary systems shown and described above, methodologies that can be implemented in accordance with the present invention will be better appreciated with reference to the flow charts of FIGS. 6 and 7. While, for purposes of simplicity of explanation, the methodologies are shown and described as a series of blocks, it is to be understood and appreciated that the present invention is not limited by the order of the blocks, as some blocks can, in accordance with the present invention, occur in different orders and/or concurrently with other blocks from that shown and described herein. Moreover, not all illustrated blocks may be required to implement the methodologies in accordance with the present invention.

The invention can be described in the general context of computer-executable instructions, such as program modules, executed by one or more components. Generally, program modules comprise routines, programs, objects, data structures, etc., that perform particular tasks or implement particular abstract data types. Typically the functionality of the program modules can be combined or distributed as desired in various embodiments.

FIG. 6 illustrates a methodology 600 for learning a Bayesian network utilizing decision trees to represent local distributions in accordance with an aspect of the present invention. According to the methodology 600, a complete data set is input at 602. A search algorithm that can reverse edges can be employed to learn a Bayes' net with complete tables at 604. At 606, a DAG resulting from the complete-table Bayesian network can be analyzed to determine a partial ordering of the Bayes' net learned at 604.

The DAG can be employed to delineate boundaries for and/or restrictions on decision tree growth at 608. For example, if the DAG for the complete-table Bayes' net comprises a direct path from X to Y, splits on Y in X's tree in a decision-tree Bayes' net can be prohibited. In this manner, an ordering derived from the complete-table Bayes' net can be applied as a constraint on decision tree growth, such that a high-quality approximation of the ordering can be achieved by the complete-table Bayes' net, and can be subsequently fine-tuned in order to grow decision tree(s) as local distributions within a Bayesian network. At 610, a decision trees can be grown that respect the partial ordering defined by the complete-table DAG in order to construct a new Bayes' net that utilizes the decision trees in local distributions.

FIG. 7 is an illustration of a methodology 700 for learning a Bayesian network using complete data table(s) in accordance with an aspect of the invention. At 702, a complete data set is input, and learning algorithm is employed to identify edges between nodes therein at 704, in order to determine a partial ordering of a Bayes' net with complete tables. The learning algorithm can further comprise a search algorithm that can manipulate edges in the complete-table Bayes' net. At 706, a determination is made regarding whether edge scores can be increased in the complete-table Bayes' net. Such a determination can be made, for example, by measuring correlation(s) between nodes to assess the degree to which nodes are statistically dependent. Such a determination facilitates determining an ordering structure in a manner more efficient that conventionally available. For example, determining that an edge exists between two nodes can indicate that the nodes are statistically dependent, but cannot provide information regarding the magnitude of the dependence. By assessing edge scores, a degree of dependence can be quantified. Such in turn permits a determination of a best ordering to facilitate learning a statistical model, such as a Bayesian net.

If considerations at 706 indicate that an edge score can be increased, then such considerations can be followed at 708, where the low-scoring edge can be removed and replaced, reversed, etc., in order to improve the score of the particular edge, thus facilitating a good ordering for the statistical model. When the edge has been manipulated to achieve the higher edge score, the method can revert to 704 for further potential iterations of the methodology. In this manner, the methodology 700 can employ feedback/feed-forward loop(s) to permit iterative edge replacement and/or adjustment to realize an optimal ordering of vertices in a data table. Additionally, if it is determined at 706 that edge scores cannot be improved (e.g., extant edges exhibit higher probabilities of correctness than other potential arrangements, etc.), the method can proceed to 710 where a Bayesian Network can be learned via decision tree growth based at least in part on the partial ordering obtained from the Bayes' net with complete data tables. Upon learning the Bayes' net with optimal decision trees, the Bayes' net can be output at 712. Thus, the methodology 700 can manipulate edges in a Bayes' net with complete data tables in order to facilitate identifying orderings that permit a higher-scoring model to be learned, which in turn facilitates an improved decision-tree Bayes' net to be learned.

Figure 8:
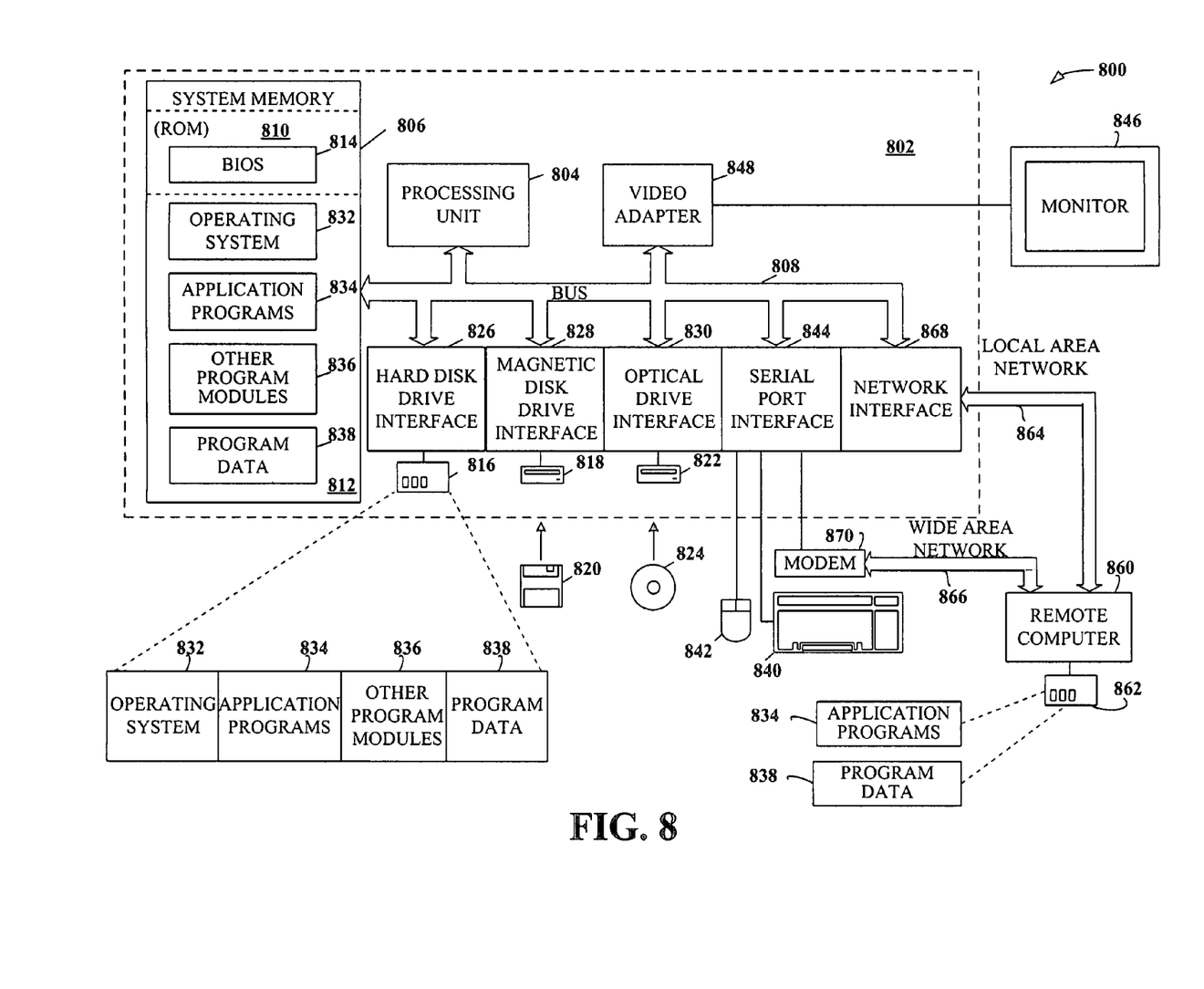
FIG. 8 illustrates an example operating environment in which the present invention can function.
Figure 9:
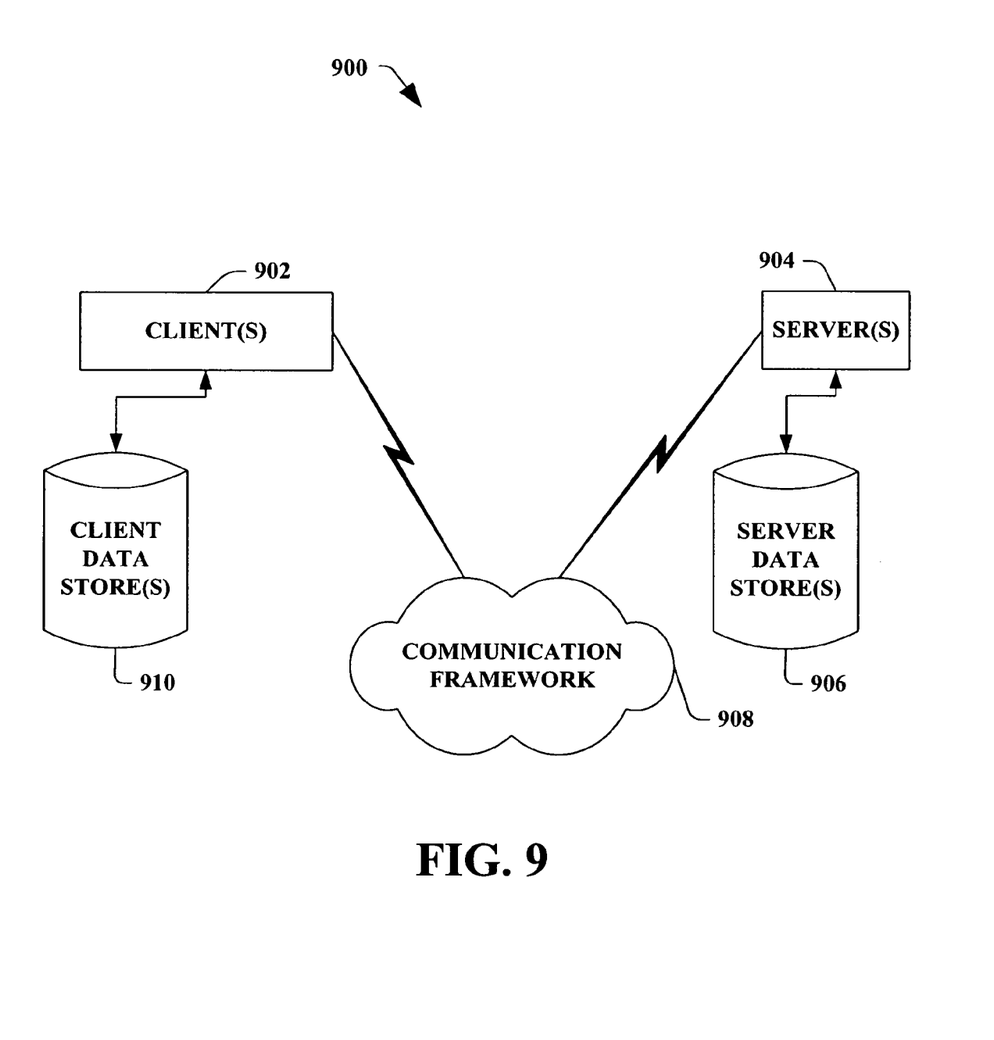
FIG. 9 illustrates another example operating environment in which the present invention can function.

In order to provide additional context for implementing various aspects of the present invention, FIGS. 8 and 9 and the following discussion are intended to provide a brief, general description of a suitable computing environment(s) 800 and 900 in which the various aspects of the present invention can be implemented. While the invention has been described above in the general context of computer-executable instructions of a computer program that runs on a local computer and/or remote computer, those skilled in the art will recognize that the invention also can be implemented in combination with other program modules. Generally, program modules comprise routines, programs, components, data structures, etc. that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can operatively communicate with one or more associated devices. The illustrated aspects of the invention can also be practiced in distributed computing environments where certain tasks are performed by remote processing devices that are linked through a communications network. However, some, if not all, aspects of the invention can be practiced on stand-alone computers. In a distributed computing environment, program modules can be located in local and/or remote memory storage devices.

As used in this application, the term "component" is intended to refer to a computer-related entity, either hardware, a combination of hardware and software, software, or software in execution. For example, a component can be, but is not limited to, a process running on a processor, a processor, an object, an executable, a thread of execution, a program, and a computer. By way of illustration, an application running on a server and/or the server can be a component. In addition, a component can comprise one or more subcomponents.

With reference to FIG. 8, an exemplary system environment 800 for implementing the various aspects of the invention comprises a conventional computer 802, including a processing unit 804, a system memory 806, and a system bus 808 that couples various system components, including the system memory, to the processing unit 804. The processing unit 804 can be any commercially available or proprietary processor. In addition, the processing unit can be implemented as multi-processor formed of more than one processor, such as can be connected in parallel.

The system bus 808 can be any of several types of bus structure including a memory bus or memory controller, a peripheral bus, and a local bus using any of a variety of conventional bus architectures such as PCI, VESA, Microchannel, ISA, and EISA, to name a few. The system memory 806 comprises read only memory (ROM) 810 and random access memory (RAM) 812. A basic input/output system (BIOS) 814, containing the basic routines that help to transfer information between elements within the computer 802, such as during start-up, is stored in ROM 810.

The computer 802 also can comprise, for example, a hard disk drive 816, a magnetic disk drive 818, e.g., to read from or write to a removable disk 820, and an optical disk drive 822, e.g., for reading from or writing to a CD-ROM disk 824 or other optical media. The hard disk drive 816, magnetic disk drive 818, and optical disk drive 822 are connected to the system bus 808 by a hard disk drive interface 826, a magnetic disk drive interface 828, and an optical drive interface 830, respectively. The drives 816-822 and their associated computer-readable media provide nonvolatile storage of data, data structures, computer-executable instructions, etc. for the computer 802. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 800, and further that any such media can contain computer-executable instructions for performing the methods of the present invention.

A number of program modules can be stored in the drives 816-822 and RAM 812, including an operating system 832, one or more application programs 834, other program modules 836, and program data 838. The operating system 832 can be any suitable operating system or combination of operating systems. By way of example, the application programs 834 and program modules 836 can comprise a model (or pattern) and/or a dependency network that utilizes a data set in accordance with an aspect of the present invention. Additionally, the program data 838 can comprise input data from which a model (or pattern) is generated and/or on which a query is performed in accordance with an aspect of the present invention.

A user can enter commands and information into the computer 802 through one or more user input devices, such as a keyboard 840 and a pointing device (e.g., a mouse 842). Other input devices (not shown) can comprise a microphone, a joystick, a game pad, a satellite dish, wireless remote, a scanner, or the like. These and other input devices are often connected to the processing unit 804 through a serial port interface 844 that is coupled to the system bus 808, but can be connected by other interfaces, such as a parallel port, a game port or a universal serial bus (USB). A monitor 846 or other type of display device is also connected to the system bus 808 via an interface, such as a video adapter 848. In addition to the monitor 846, the computer 802 can comprise other peripheral output devices (not shown), such as speakers, printers, etc.

It is to be appreciated that the computer 802 can operate in a networked environment using logical connections to one or more remote computers 860. The remote computer 860 can be a workstation, a server computer, a router, a peer device or other common network node, and typically comprises many or all of the elements described relative to the computer 802, although, for purposes of brevity, only a memory storage device 862 is illustrated in FIG. 8. The logical connections depicted in FIG. 8 can comprise a local area network (LAN) 864 and a wide area network (WAN) 866. Such networking environments are commonplace in offices, enterprise-wide computer networks, intranets and the Internet.

When used in a LAN networking environment, for example, the computer 802 is connected to the local network 864 through a network interface or adapter 868. When used in a WAN networking environment, the computer 802 typically comprises a modem (e.g., telephone, DSL, cable, etc.) 870, or is connected to a communications server on the LAN, or has other means for establishing communications over the WAN 866, such as the Internet. The modem 870, which can be internal or external relative to the computer 802, is connected to the system bus 808 via the serial port interface 844. In a networked environment, program modules (including application programs 834) and/or program data 838 can be stored in the remote memory storage device 862. It will be appreciated that the network connections shown are exemplary and other means (e.g., wired or wireless) of establishing a communications link between the computers 802 and 860 can be used when carrying out an aspect of the present invention.

In accordance with the practices of persons skilled in the art of computer programming, the present invention has been described with reference to acts and symbolic representations of operations that are performed by a computer, such as the computer 802 or remote computer 860, unless otherwise indicated. Such acts and operations are sometimes referred to as being computer-executed. It will be appreciated that the acts and symbolically represented operations comprise the manipulation by the processing unit 804 of electrical signals representing data bits which causes a resulting transformation or reduction of the electrical signal representation, and the maintenance of data bits at memory locations in the memory system (including the system memory 806, hard drive 816, floppy disks 820, CD-ROM 824, and remote memory 862) to thereby reconfigure or otherwise alter the computer system's operation, as well as other processing of signals. The memory locations where such data bits are maintained are physical locations that have particular electrical, magnetic, or optical properties corresponding to the data bits.

FIG. 9 is another block diagram of a sample computing environment 900 with which the present invention can interact The system 900 further illustrates a system that comprises one or more client(s) 902. The client(s) 902 can be hardware and/or software (e.g., threads, processes, computing devices). The system 900 also comprises one or more server(s) 904. The server(s) 904 can also be hardware and/or software (e.g. threads, processes, computing devices). The servers 904 can house Threads to perform transformations by employing the present invention, for example. One possible communication between a client 902 and a server 904 can be in the form of a data packet adapted to be transmitted between two or more computer processes. The system 900 comprises a communication framework 908 that can be employed to facilitate communications between the client(s) 902 and the server(s) 904. The client(s) 902 are operably connected to one or more client data store(s) 910 that can be employed to store information local to the client(s) 902. Similarly, tbe server(s) 904 are operably connected to one or more server data store(s) 906 tat can be einployedto store information local to the servers 904.

It is to be appreciated that the apparatus, systems and/or methods of the present invention can be utilized in an overall power conservation scheme facilitating computer components and non-computer related components alike. Further, those skilled in the art will recognize that the apparatus, systems and/or methods of the present invention can be employed in a vast array of electronic related technologies, including, but not limited to, computers, servers and/or handheld electronic devices and the like.

What has been described above comprises examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising a computer processor for executing the following software components, the system facilitates learning Bayesian networks with local distributions, where at least one distribution is not a complete table, the system is recorded on a computer-readable storage medium and capable of execution by a computer, comprising:

a complete data set;

a Bayesian network constructor component that constructs a complete-table Bayesian network to represent local distributions of data in the complete data set and employs a learning algorithm that can reverse edges in the complete-table Bayesian network to facilitate learning a decision-tree Bayesian network, the Bayesian network constructor component further analyzes a directed graph that results from the complete-table Bayesian network to determine a partial ordering of the complete-table Bayesian network; and wherein the Bayesian network constructor component analyzes the complete data set and the complete-table Bayesian network using a search algorithm to identify other potential arrangements of edges within the Bayesian network and compares the other arrangements to the partial ordering of the complete-table Bayesian network.

2. The system of claim 1, the learning algorithm permits construction of the local distributions to the partial ordering of the directed acyclic graph of the complete-table Bayesian network.

3. The system of claim 1, the Bayesian network constructor component determines a score for each edge in the complete-table Bayesian network.

4. The system of claim 3, the Bayesian network constructor component determines a score for at least one other potential edge configuration in the complete-table Bayesian network to assess whether the score of an edge can be improved.

5. The system of claim 4, the Bayesian network constructor component manipulates at least one edge in the complete-table Bayesian network if manipulation of the edge will improve the score of the edge.

6. The system of claim 5, the local distributions comprise at least one decision tree.

7. The system of claim 5, the local distributions comprise at least one support vector machine.

8. The system of claim 5, the local distributions comprise at least one logistic regression.

9. A device employing the system of claim 1 comprising at least one of a computer, a server, and a handheld electronic device.

10. A computer-readable storage medium storing computer executable instructions operable to perform a method for learning Bayesian networks with at least one distribution that is not a complete table, comprising:

inputting a complete data set via a user into a Bayesian network constructor for analysis of the complete data set;

learning a first Bayesian network that comprises complete tables;

analyzing a directed acyclic graph of a complete-table Bayesian network;

learning a second Bayesian network that comprises a distribution with at least one non-complete-table-distribution;

learning the first Bayesian network comprises employing a search algorithm that can reverse edges in the complete-table Bayesian network; and displaying results of learning the first and second Bayesian networks.

11. The method of claim 10, further comprising determining a score for at least one edge in the complete-table Bayesian network.

12. The method of claim 11, further comprising determining scores for other potential edge configurations in the complete-table Bayesian network.

13. The method of claim 12, further comprising comparing the score of the at least one edge to the score for another potential edge configuration to determine whether the score of the at least one edge can be improved.

14. The method of claim 13, further comprising refining the complete-table Bayesian network by manipulating the at least one edge to improve the score of the at least one edge if it is determined that the score of the at least one edge can be improved.

15. The method of claim 14, further comprising refraining from manipulating edges in the complete-table Bayesian network if it is determined that no edge score can be improved.

16. The method of claim 15, further comprising deriving a set of constraints on construction of the local distributions in the second Bayesian network based on the directed acyclic graph of the complete-table Bayesian network once it is determined that no edge score can be improved.

17. The method of claim 16, deriving the set of constraints comprises evaluating the directed acyclic graph of the complete-table Bayesian network to identify all edges in a refined complete-table Bayesian network.

18. The method of claim 17, learning the second Bayesian network comprises employing a constrained learning algorithm that respects the partial order of the directed acyclic graph of the refined complete-table Bayesian network.

19. The method of claim 18, further comprising growing decision trees as local distributions that define the second Bayesian network.

20. The method of claim 11, determining a score for at least one edge comprises:
  determining a degree of dependency between nodes connected by the at least one edge;
  determining a direction of dependence between nodes connected by the at least one edge; and
  assessing whether the direction of that at least one edge is correct based at least in part on the direction of dependence between nodes connected by the at least one edge.

21. The method of claim 20, further comprising determining whether the score of the at least one edge is a best possible score by comparing the score of the at least one edge to scores for all other possible arrangements of the nodes and the at least one edge.

22. The method of claim 21, further comprising reversing the direction of the edge to improve edge score if the score of the at least one edge is lower than a score for another possible arrangement of the nodes and the at least one edge.

23. A system that facilitates learning Bayesian networks with decision trees, comprising:
  means for learning a complete-table Bayesian network from a data set;
  means for refining a directed acyclic graph resulting from the complete-table Bayesian network;
  means for learning a Bayesian network with at least one non-complete-table distribution, whereby local distributions are constructed in accordance with constraints imposed by a partial order of the directed acyclic graph of the complete-table Bayesian net;
  means for learning the Bayesian network comprises employing a search algorithm that can reverse edges in the complete-table Bayesian network; and
  means for displaying results of learning the Bayesian network.

* * * * *

UNITED STATES PATENT AND TRADEMARK OFFICE
CERTIFICATE OF CORRECTION

PATENT NO. : 7,320,002 B2  
APPLICATION NO. : 10/809054  
DATED : January 15, 2008  
INVENTOR(S) : David M. Chickering Page 1 of 1

It is certified that error appears in the above-identified patent and that said Letters Patent is hereby corrected as shown below:

In column 13, line 67, in Claim 1, after "directed" insert -- acyclic --.

In column 14, line 27, in Claim 6, after "5," insert -- wherein --.

In column 14, line 29, in Claim 7, after "5," insert -- wherein --.

In column 14, line 31, in Claim 8, after "5," insert -- wherein --.

Signed and Sealed this  
Fifteenth Day of February, 2011

David J. Kappos  
*Director of the United States Patent and Trademark Office*